(12) United States Patent
Suzuki et al.

(10) Patent No.: US 10,562,115 B2
(45) Date of Patent: Feb. 18, 2020

(54) ELECTRIC POWER TOOL AND METHOD FOR MANUFACTURING THE SAME

(71) Applicant: MAKITA CORPORATION, Anjo-shi, Aichi (JP)

(72) Inventors: Ryosuke Suzuki, Anjo (JP); Akira Niwa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 314 days.

(21) Appl. No.: 15/631,949

(22) Filed: Jun. 23, 2017

(65) Prior Publication Data

US 2018/0029148 A1 Feb. 1, 2018

(30) Foreign Application Priority Data

Jul. 29, 2016 (JP) .................................. 2016-150349

(51) Int. Cl.
| | | |
|---|---|---|
| *H02K 7/14* | (2006.01) | |
| *B23D 47/02* | (2006.01) | |
| *B25F 5/00* | (2006.01) | |
| *B23B 45/00* | (2006.01) | |
| *B23B 45/02* | (2006.01) | |
| *B23D 51/02* | (2006.01) | |
| *B27B 9/00* | (2006.01) | |

(52) U.S. Cl.
CPC ............ *B23D 47/02* (2013.01); *B23B 45/001* (2013.01); *B23B 45/008* (2013.01); *B23B 45/02* (2013.01); *B23D 51/02* (2013.01); *B25F 5/008* (2013.01); *B27B 9/00* (2013.01); *B23B 2260/128* (2013.01)

(58) Field of Classification Search
CPC ............ H05K 3/00; H05K 3/06; H05K 3/065; H05K 3/28; H05K 3/284; H05K 3/34; H05K 3/30; H05K 3/341; H05K 3/3415; H05K 5/02; H05K 5/024; H05K 5/0243; H05K 5/003; H05K 5/0034; H05K 5/06; H05K 5/065; H05K 7/00; H05K 7/20; H05K 7/208; H05K 7/2085; H05K 7/20854; H01R 12/00; H01R 12/72; H01R 12/724; H02B 1/00; B23B 45/00; B23B 45/001; B23B 45/008; B23B 45/02; B23D 47/00; B23D 47/02; B23D 51/00; B23D 51/02; B25F 5/00; B25F 5/008; B27B 9/00

See application file for complete search history.

(56) References Cited

U.S. PATENT DOCUMENTS

| | | | | |
|---|---|---|---|---|
| 3,976,720 A | * | 8/1976 | Hammer ................ | C08G 81/02 525/183 |
| 2006/0272150 A1 | * | 12/2006 | Eguchi .................. | H05K 3/284 29/841 |
| 2011/0068642 A1 | * | 3/2011 | Takeyama .............. | B25F 5/008 310/50 |

FOREIGN PATENT DOCUMENTS

JP    2007-295773 A    11/2007

* cited by examiner

*Primary Examiner* — Tran N Nguyen
(74) *Attorney, Agent, or Firm* — Oliff PLC

(57) ABSTRACT

A covering member made of a resin is integrally molded with a sensor substrate of a brushless motor in a circular saw by low-temperature, low-pressure injection molding. The covering member covers rotation detecting elements, a thermistor, resistors, and connecting portions (terminals) of lead wires that serve as electrically conductive portions conducting electric currents.

8 Claims, 14 Drawing Sheets

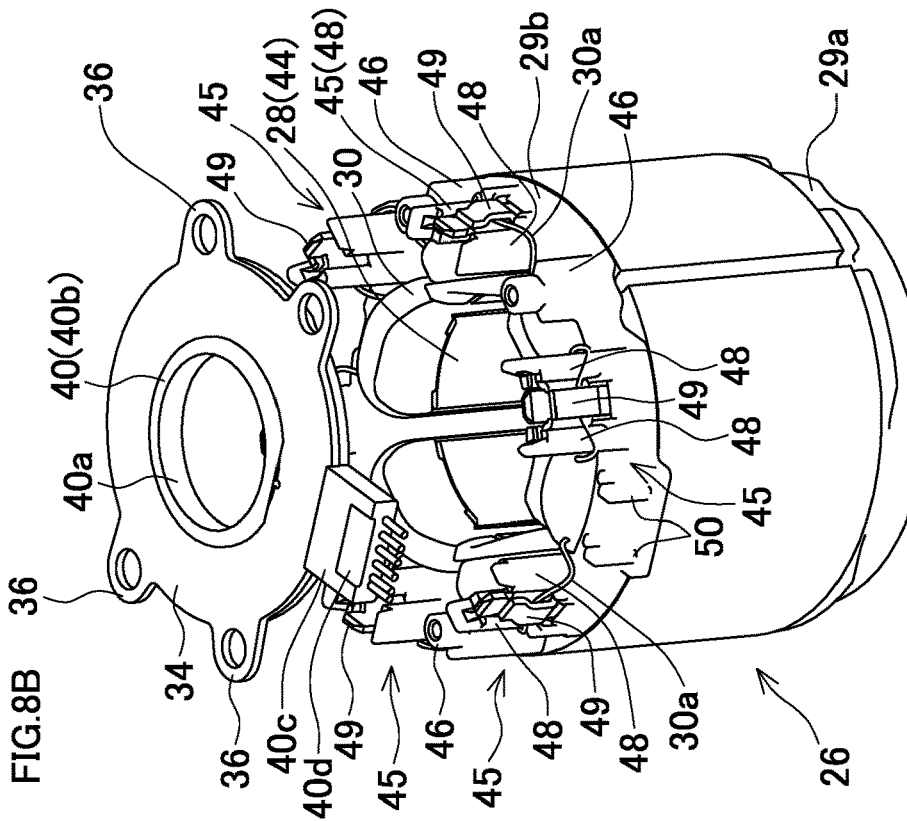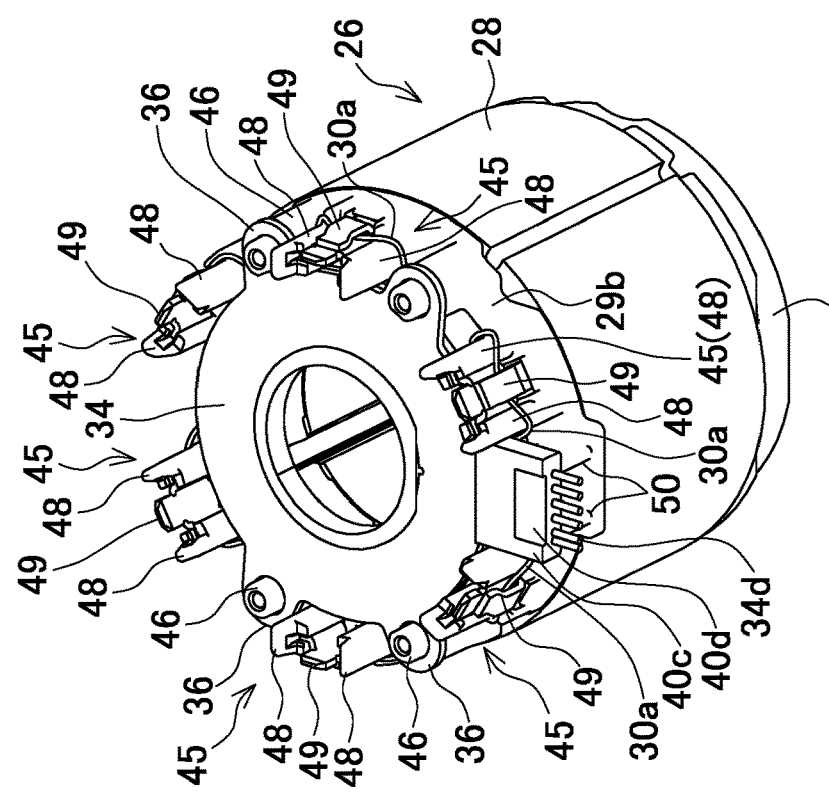

FIG.11A
FIG.11B
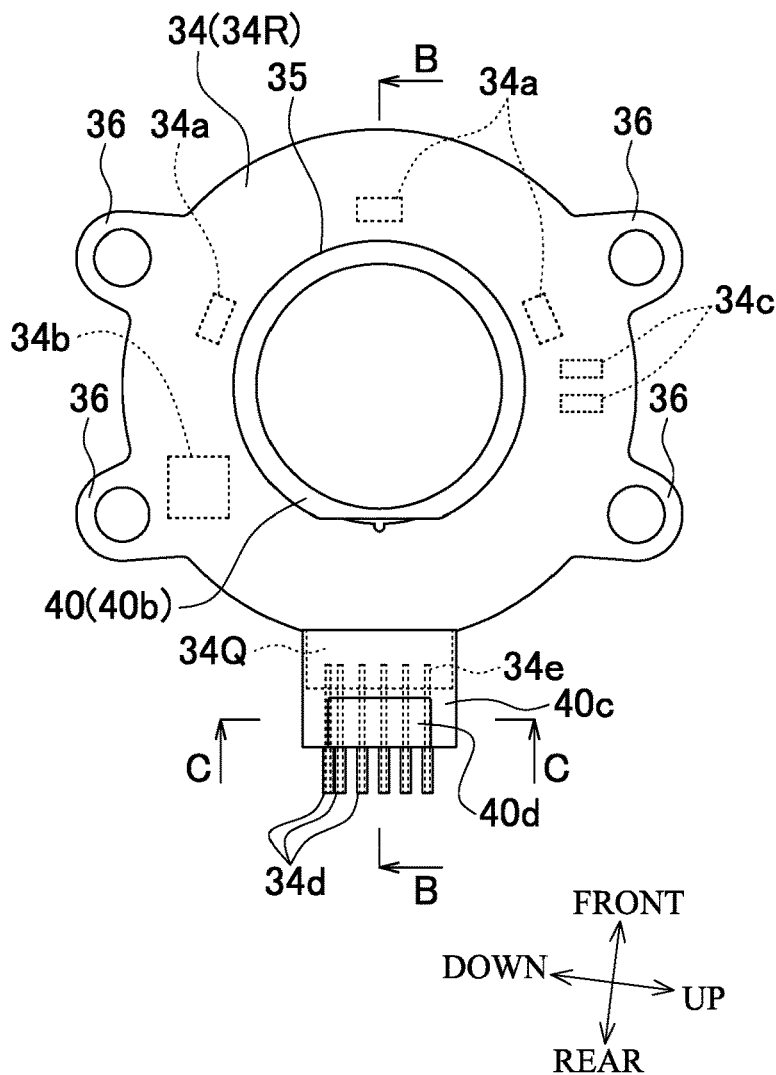
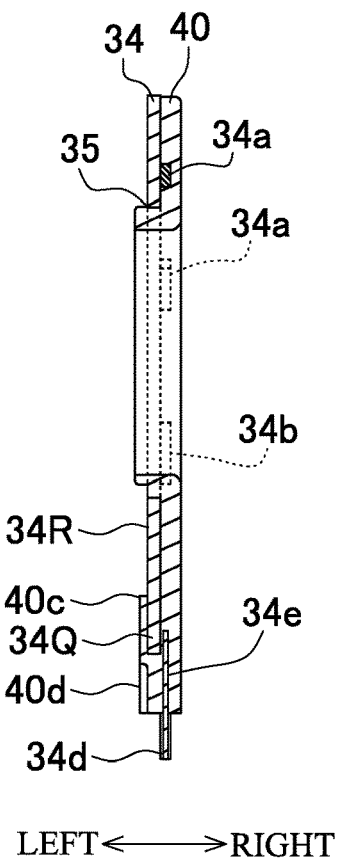
FIG.11C
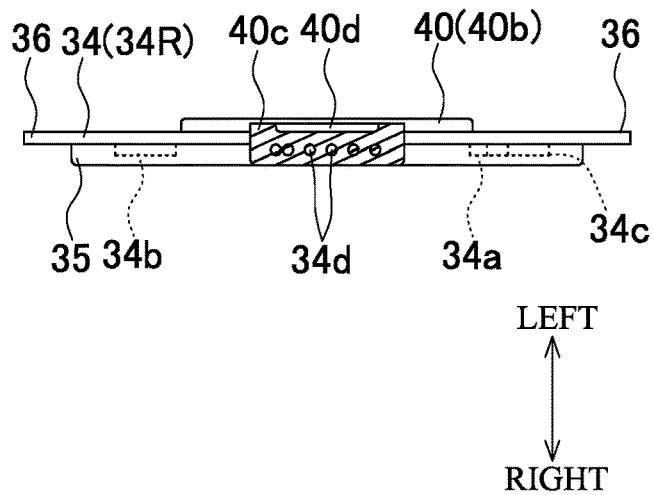

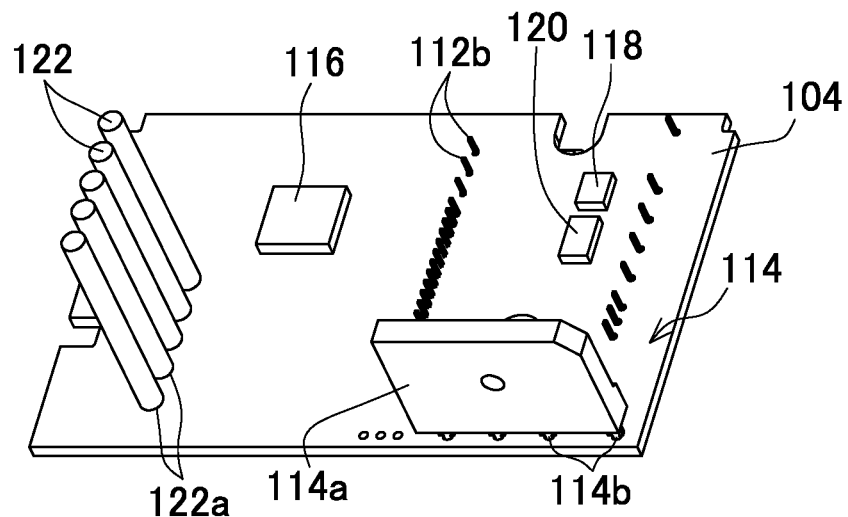
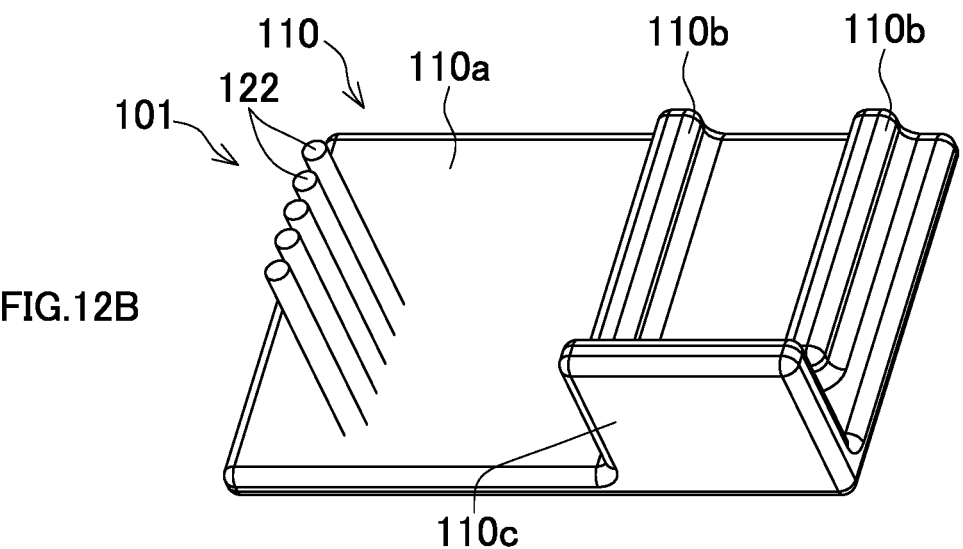
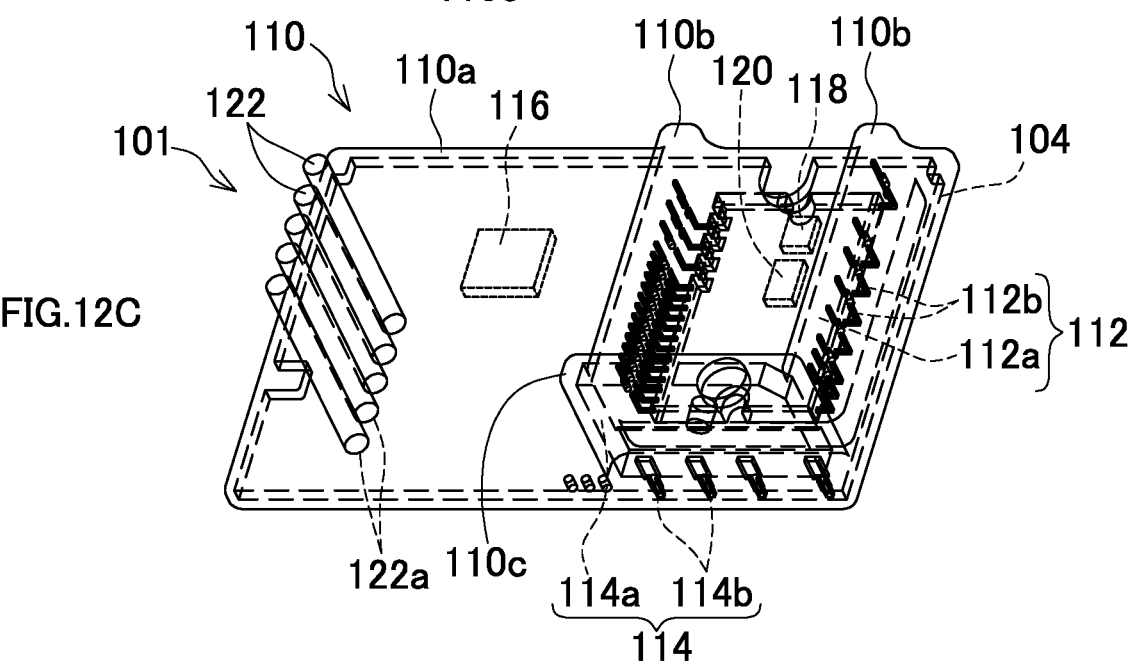
FIG.12A
FIG.12B
FIG.12C

ELECTRIC POWER TOOL AND METHOD FOR MANUFACTURING THE SAME

BACKGROUND

This application claims the benefit of Japanese Patent Application Number 2016-150349 filed on Jul. 29, 2016, the entirety of which is incorporated by reference.

FIELD OF THE INVENTION

The present invention relates to an electric power tool, such as a circular saw, and a method for manufacturing the electric power tool.

DESCRIPTION OF RELATED ART

A motor described in Japanese Patent Application Publication No. 2007-295773 (JP 2007-295773 A) is known as a motor usable as a drive source in an electric power tool, such as a circular saw.

The motor of JP 2007-295773 A is a brushless motor having a four-pole structure, and includes a rotor provided with a magnet (permanent magnet), a stator that is fixed inside a main body case and located around the rotor, a sensor substrate for detecting the rotational position of the rotor, and an electric control board including a drive circuit. The sensor substrate is equipped with three magnetic sensors for detecting positions of magnetic poles of the rotor, and is screwed onto a rear surface of an electrical insulating member with three screws.

SUMMARY OF THE INVENTION

Besides the motor described above, a technique is known in which fixation of electronic components mounted on a substrate is reinforced by adhesive. When such reinforcement is applied, the adhesive is generally applied by injection with a dispenser. However, the application work is relatively difficult due to, for example, fluidity or progression of hardening with time of the adhesive, and has difficulty in ensuring quality, such as ensuring a uniform injection amount and ensuring injection into a predetermined range (prevention of flowing out of the predetermined range). Furthermore, the adhesive requires a drying process of one to several days after the injection process, thus requiring a relatively long period of time for installing the substrate in the motor.

An object of the present invention is to provide an electric power tool that allows at least some of electronic components and the like on a substrate to be easily reinforced in fixation or insulated in a short period of time, that has a high degree of freedom of layout of members adjacent to the substrate, and that has a compact structure in the vicinity of the substrate and consequently a compact overall size, and to provide a method for manufacturing the electric power tool.

To achieve the object described above, according to a first aspect of the present invention, an electric power tool includes a substrate including an electrically conductive portion configured to conduct electricity, in which a covering member made of a resin covering at least a part of the electrically conductive portion is formed by low-temperature, low-pressure injection molding.

To achieve the object described above, according to a second aspect of the present invention, an electric power tool includes a substrate including an electrically conductive portion configured to conduct electricity, in which at least a part of the electrically conductive portion is covered with a covering member made of a resin, and the resin is a thermoplastic resin having a softening point below 200° C.

In the above aspects, the covering member may have a recessed portion or a raised portion that makes a thickness of the covering member more uniform.

In the above aspects, the resin may contain, as a main component, a polyamide having a softening point below 200° C. and containing an aliphatic skeleton.

In the above aspects, the electrically conductive portion may include a conductive projecting portion projecting relative to a peripheral portion of the conductive projecting portion on the substrate, and the covering member may cover the conductive projecting portion and the peripheral portion.

In the above aspects, the covering member may be in contact with a plurality of faces of the substrate.

In the above aspects, a lead wire may be connected to the substrate, and the covering member may cover a connecting portion between the lead wire and the substrate.

In the above aspects, the electric power tool may further include a support member including a receiving portion in contact with the covering member.

In the above aspects, at least a part of the covering member may be flat.

To achieve the object described above, according to a third aspect of the present invention, an electric power tool includes a substrate including an electrically conductive portion configured to conduct electricity, a covering member made of a resin covering at least a part of the electrically conductive portion, in which at least a part of the covering member is flat.

In the above aspect, the covering member may be formed by low-temperature, low-pressure injection molding.

The present invention provides an electric power tool that allows at least some of electronic components and the like on a substrate to be easily reinforced in fixation or insulated in a short period of time, that has a high degree of freedom of layout of members adjacent to the substrate, and that has a compact structure in the vicinity of the substrate and consequently a compact overall size, and provides a method for manufacturing the electric power tool.

BRIEF DESCRIPTION OF THE DRAWINGS

FIGS. 8A and 8B are a perspective view and an exploded perspective view, respectively, of a stator and a sensor substrate with a covering member of a brushless motor in FIG. 1.

FIGS. 11A, 11B, and 11C are an obverse side view of the sensor substrate with the covering member of FIGS. 8A and 8B, a B-B sectional view of FIG. 11A, and a C-C sectional view of FIG. 11A, respectively.

FIGS. 12A, 12B, and 12C are perspective views of a controller, a covering member, and the covering member through which the controller is viewed, respectively, of a circular saw according to a second embodiment of the present invention.

DETAILED DESCRIPTION OF THE EMBODIMENTS

The following describes embodiments and modifications thereof according to the present invention based on the drawings where appropriate.

The directions, front, rear, upper, lower, right, and left are defined for convenience of description, and are subject to change depending on, for example, the condition of work and the state of a moving member.

The present invention is not limited to the embodiments and the modifications thereof to be described below.

First Embodiment

Figure 1:
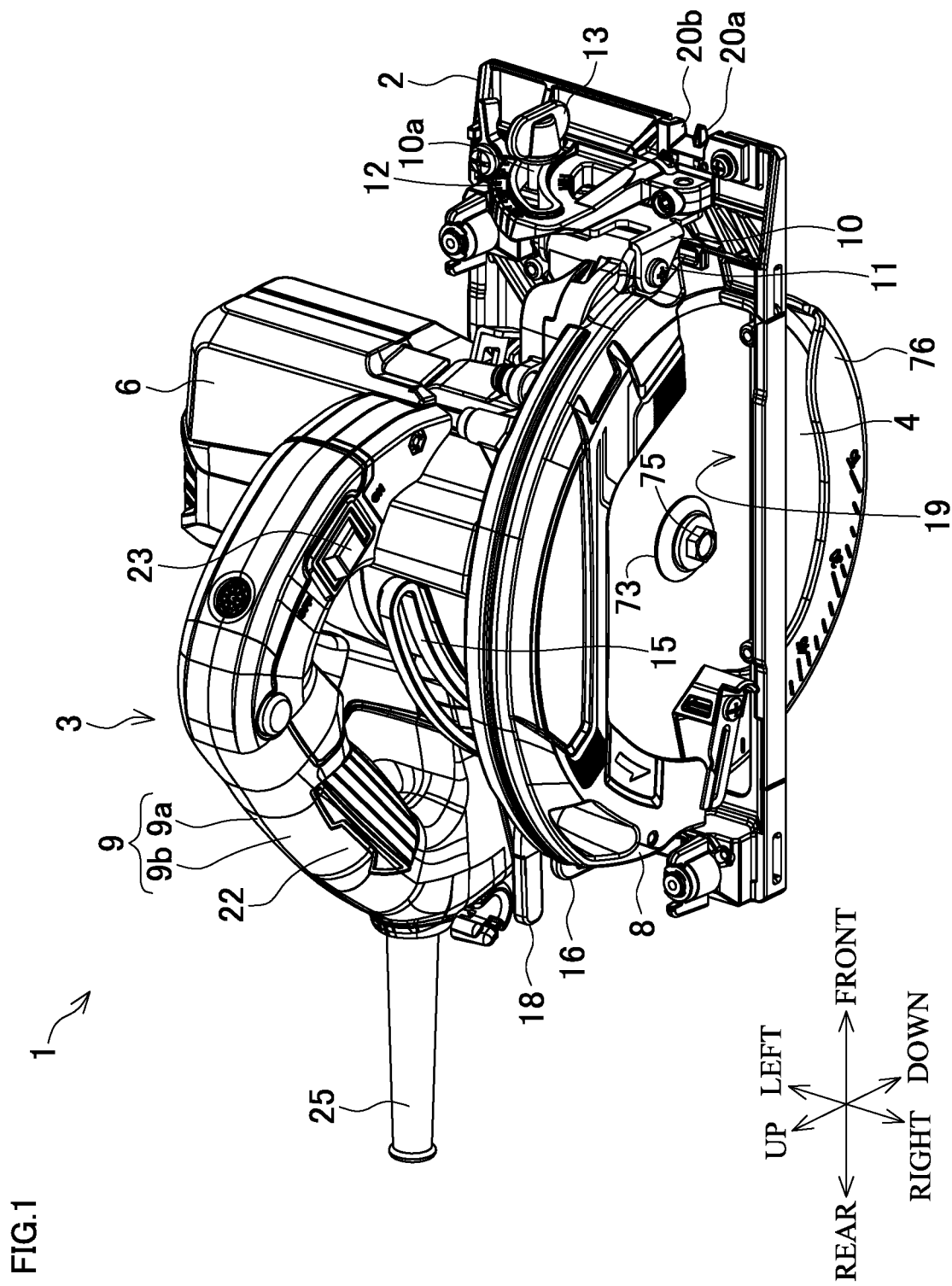
FIG. 1 is a perspective view of a circular saw according to a first embodiment of the present invention.
Figure 2:
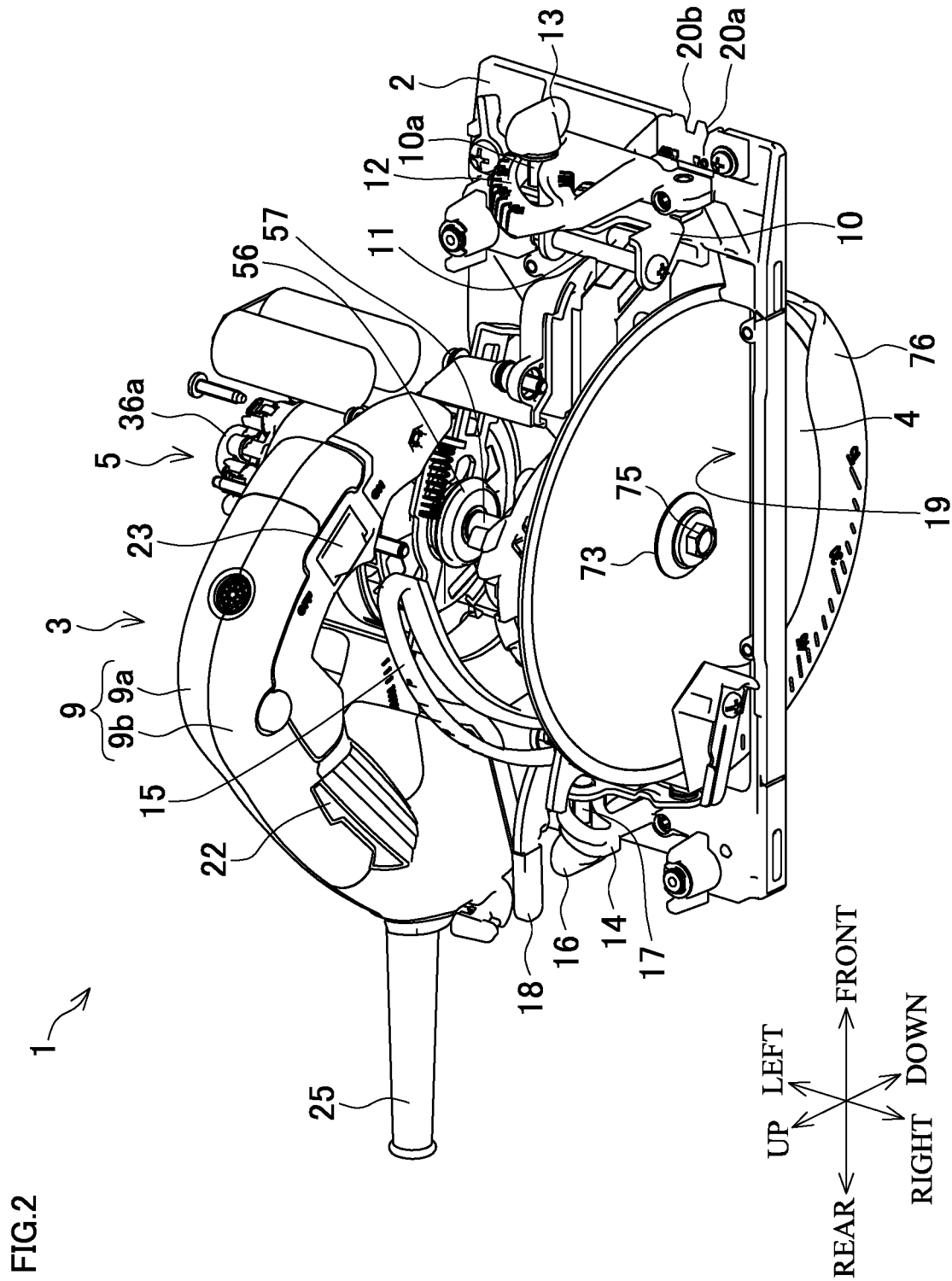
FIG. 2 is a perspective view of FIG. 1 with some of covers open.
Figure 3:
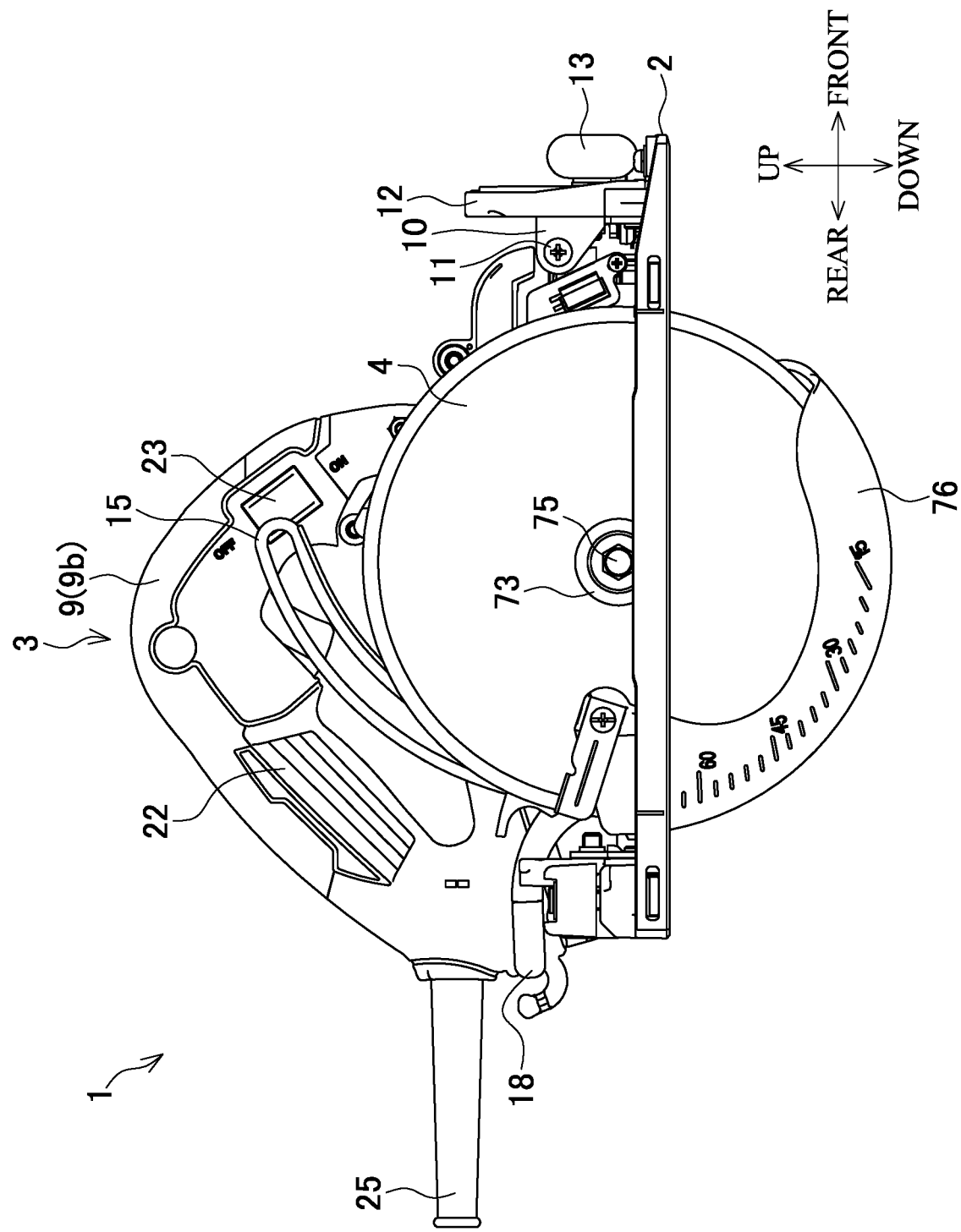
FIG. 3 is a right side view of FIG. 1 with some of the covers open.
Figure 4:
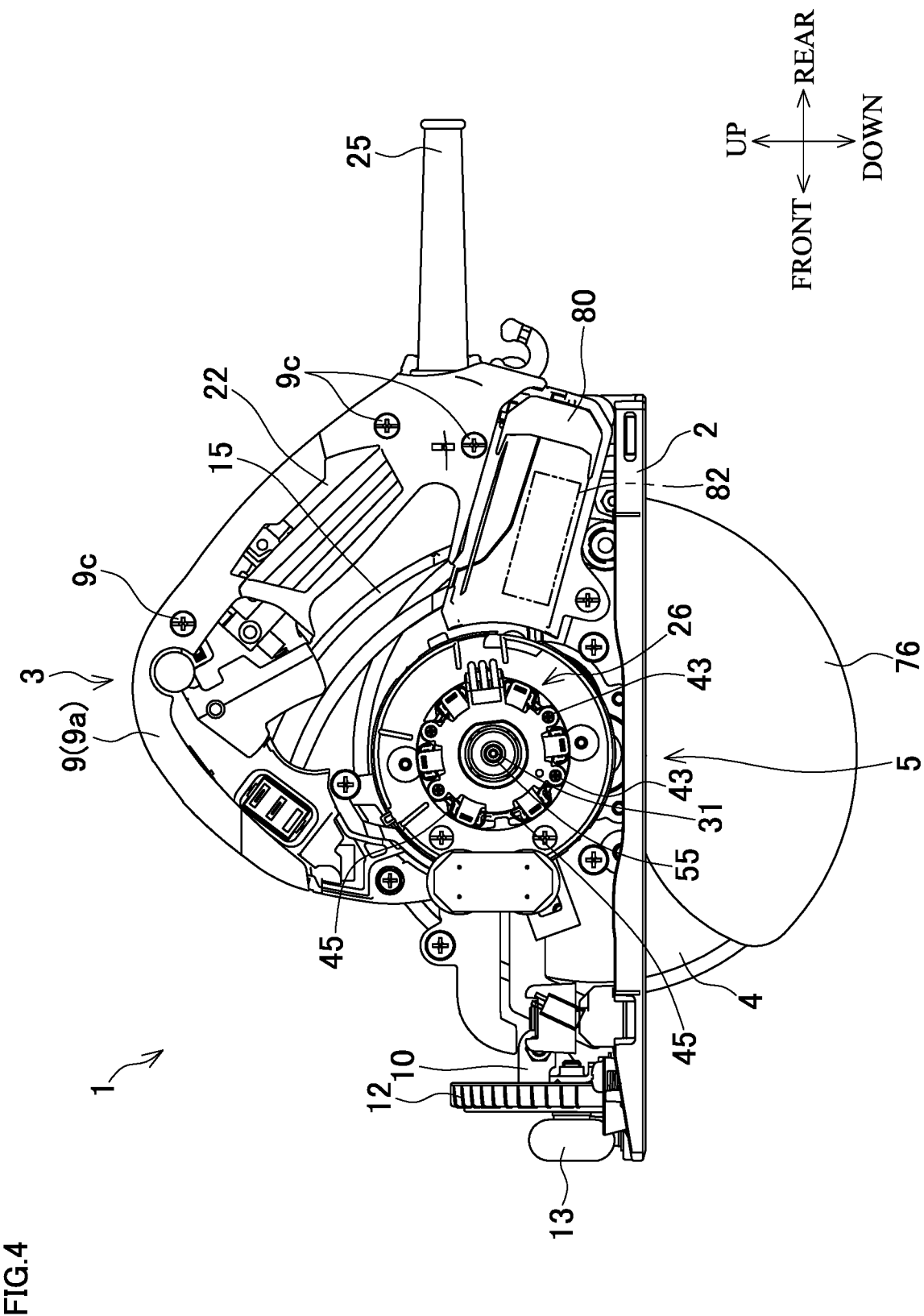
FIG. 4 is a left side view of FIG. 1 with some of the covers open.
Figure 5:
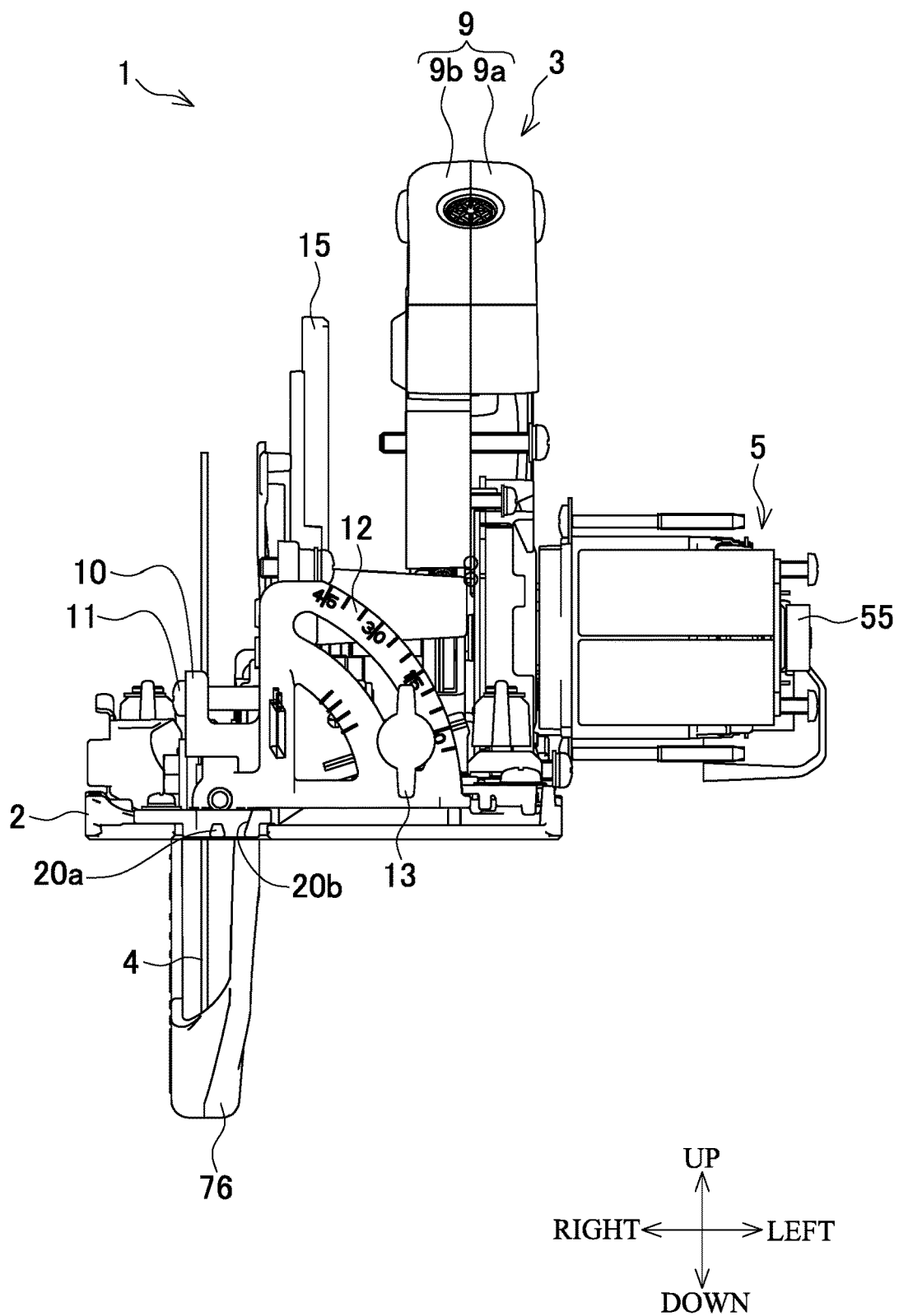
FIG. 5 is a front view of FIG. 1 with some of the covers open.
Figure 6:
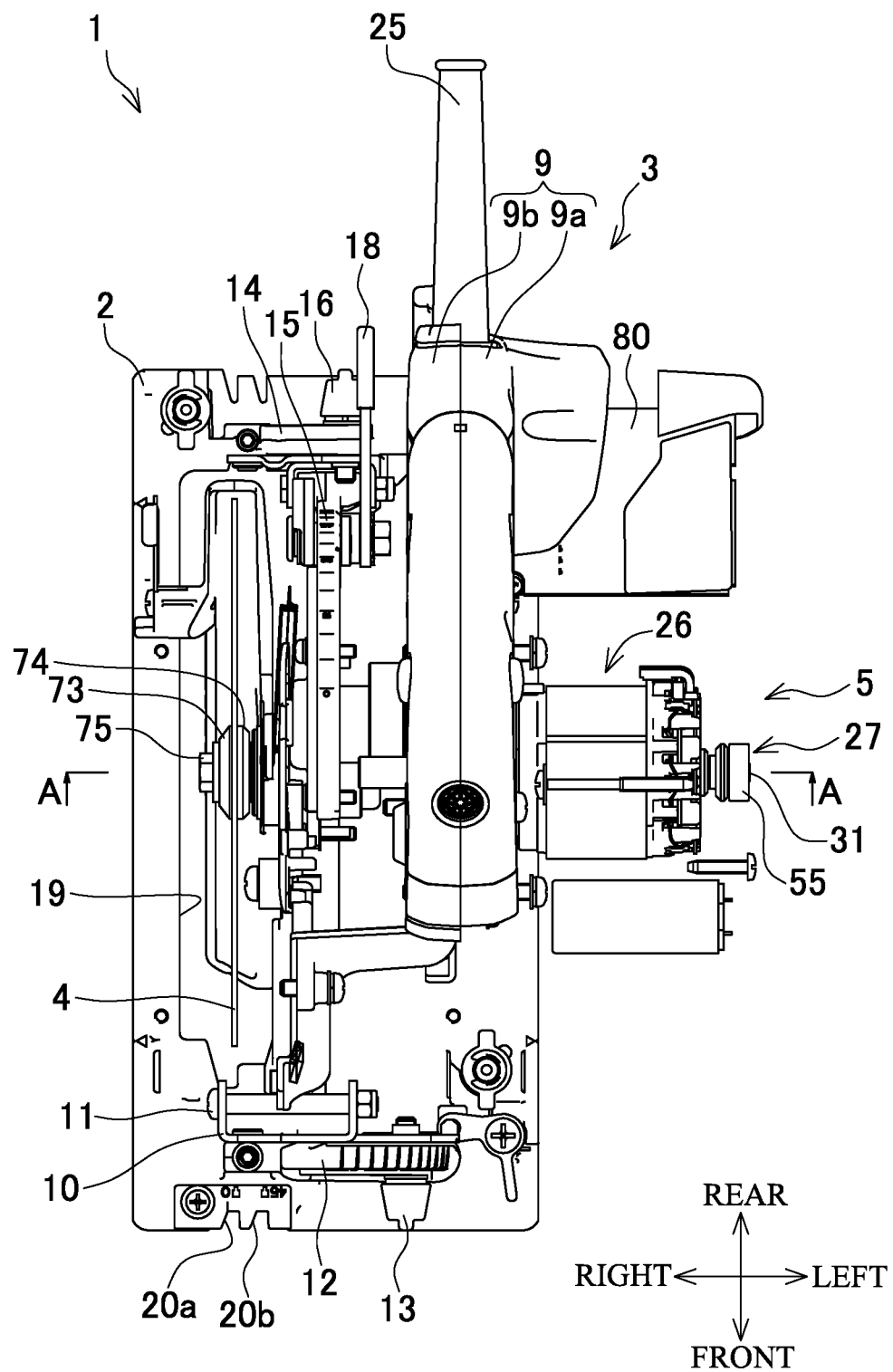
FIG. 6 is a top view of FIG. 1 with some of the covers open.
Figure 7:
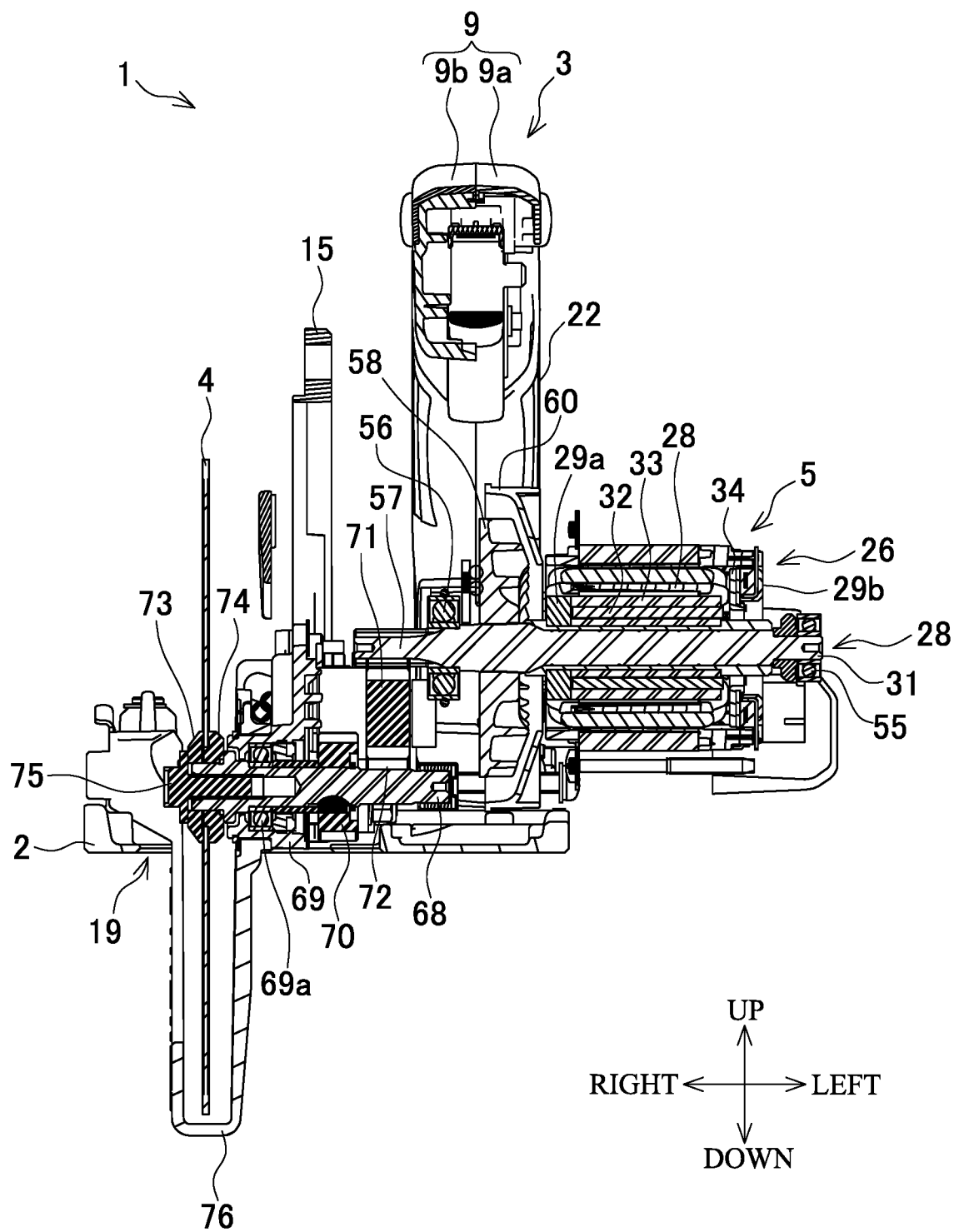
FIG. 7 is an A-A sectional view of FIG. 6.

FIG. 1 is a perspective view of a circular saw 1 according to a first embodiment of the present invention serving as an example of a (handheld) cutting machine among electric power tools. FIG. 2 is a perspective view of the circular saw 1 with some of covers thereof open. FIG. 3 is a right side view of the circular saw 1 with some of the covers thereof open. FIG. 4 is a left side view of the circular saw 1 with some of the covers thereof open. FIG. 5 is a front view of the circular saw 1 with some of the covers thereof open. FIG. 6 is a top view of the circular saw 1 with some of the covers thereof open. FIG. 7 is an A-A line sectional view of FIG. 6.

The circular saw 1 includes a flat plate-like base 2 and a main body housing 3 disposed above the base 2.

The main body housing 3 supports a saw blade 4 serving as a tip tool. A brushless motor 5 for rotationally driving the saw blade 4 is disposed in the main body housing 3. The main body housing 3 includes a motor housing 6 that holds the brushless motor 5 and a blade case 8 that is connected to a right side of the motor housing 6 and covers an upper portion of the saw blade 4.

A loop-shaped grip housing 9 is provided above the motor housing 6.

The motor housing 6 and the blade case 8 are not shown in the figures except FIG. 1.

A front portion of the blade case 8 is connected to a connection plate 10 having a U-shape in a plan view via a screw 11 passing through the connection plate 10 so as to be rotatable in the upper-lower direction of the blade case 8. The connection plate 10 is rotatably connected by a pin 10a extending in the front-rear direction to a first guide plate 12 extending in the right-left direction that stands at a front portion of the base 2 and has a circular arc-like first guide groove. The connection plate 10 is fixable by a first thumbscrew 13 to any position along the first guide groove of the first guide plate 12.

A rear side surface of the blade case 8 is provided with a roller (not illustrated) projecting sideward. The roller penetrates a depth guide 15 curved forward in a circular arc shape at a lateral side of the blade case 8. The depth guide 15 is rotatably connected by a pin 17 extending in the front-rear direction to a second guide plate 14 extending in the right-left direction that stands at a rear portion of the base 2. The second guide plate 14 has a circular arc-like second guide groove. The depth guide 15 is connected to the second guide plate 14 so as to be fixable to any position along the second guide groove by a second thumbscrew 16. A lever 18 is provided on an extended axis of the roller described above. The roller can be clamped in any position of the depth guide 15 by operation of the lever 18.

In the main body housing 3, the protrusion amount (cutting depth) of the saw blade 4 protruding downward through a rectangular hole 19 provided in the base 2 is adjustable by rotating the blade case 8 about the screw 11 to change the clamp position of the blade case 8 along the depth guide 15. By changing fixing positions of the connection plate 10 and the depth guide 15 with respect to the front first guide plate 12 and the rear second guide plate 14, respectively, the main body housing 3 can be fixed at any inclination angle, ranging from an orthogonal position where the saw blade 4 is orthogonal to the base 2 to a maximum inclination position where the saw blade 4 is tilted down rightward to be inclined at an angle of 45 degrees with respect to the base 2. At the front end of the base 2, cutouts 20a and 20b are formed in positions where side edges thereof are located on extended lines along the saw blade 4 when the saw blade 4 is in the orthogonal position (0 degrees) and in the maximum inclination position (45 degrees), respectively. By matching either of the side edges of the cutouts 20a and 20b with a marking line drawn on an upper surface of a material to be cut, the material to be cut can be easily cut along the marking line.

The grip housing 9 is disposed so as to continue to the motor housing 6, and is formed by assembling a left half-split housing 9a with a right half-split housing 9b using a plurality of screws 9c. A rear portion of the grip housing 9 serves as a grip portion 22.

A switch 23 for switching on/off, for example, the brushless motor 5 is exposed at a right portion of the grip housing 9 in front of the grip portion 22. A power cord 25 is connected to a rear side of the grip portion 22. Although an alternating-current power supply (commercial power supply) is assumed herein as a power source, a battery mounting unit or a battery can be provided instead of or in addition to the power cord 25. The battery can be a direct-current (DC) power supply (of, for example, 100 V DC or more).

The brushless motor 5 is a three-phase motor, and includes a stator 26 and a rotor 27 (inner rotor) disposed radially inward of the stator 26.

Figure 9:
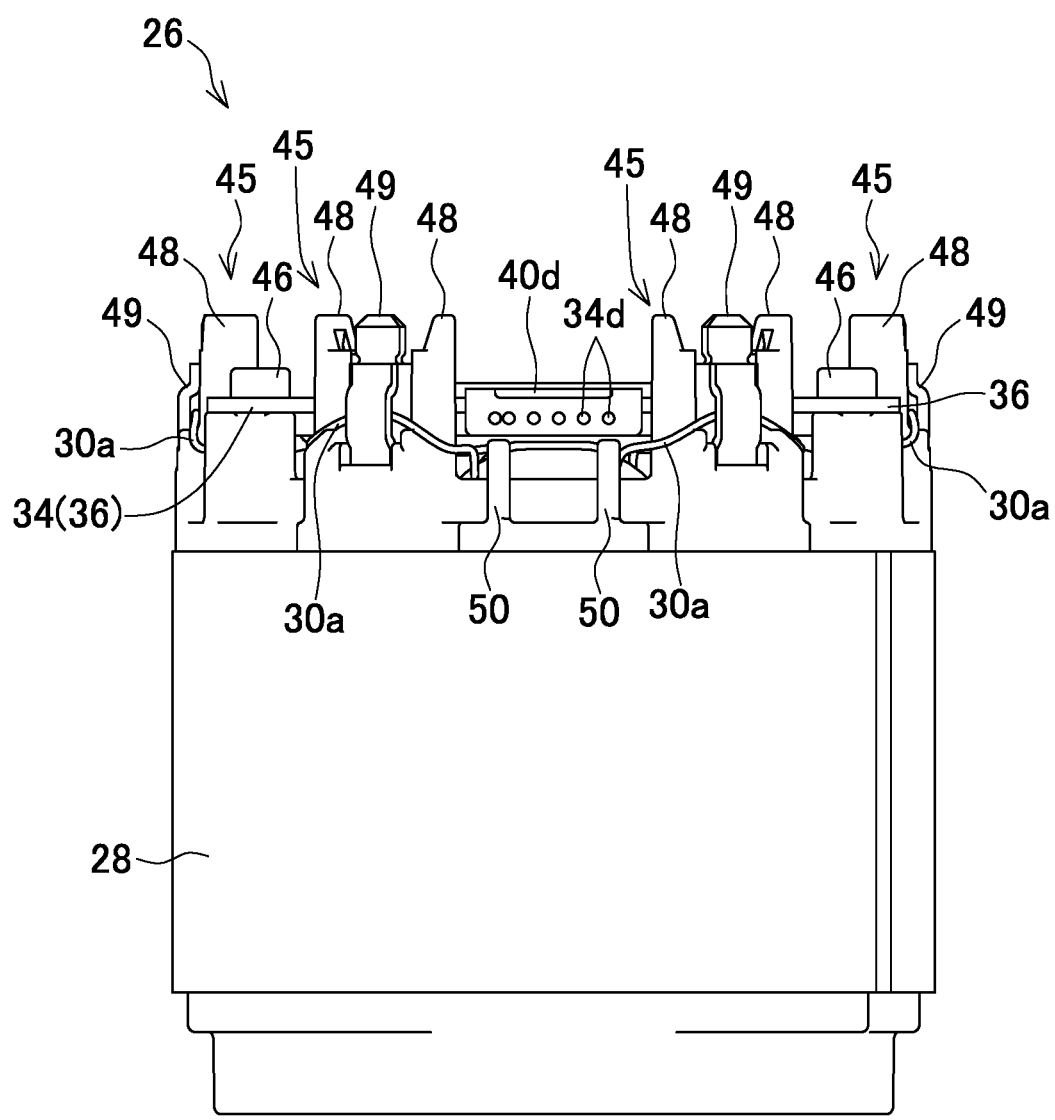
FIG. 9 is a view of the stator and the sensor substrate with the covering member of FIGS. 8A and 8B as viewed from the rear.
Figure 10A:
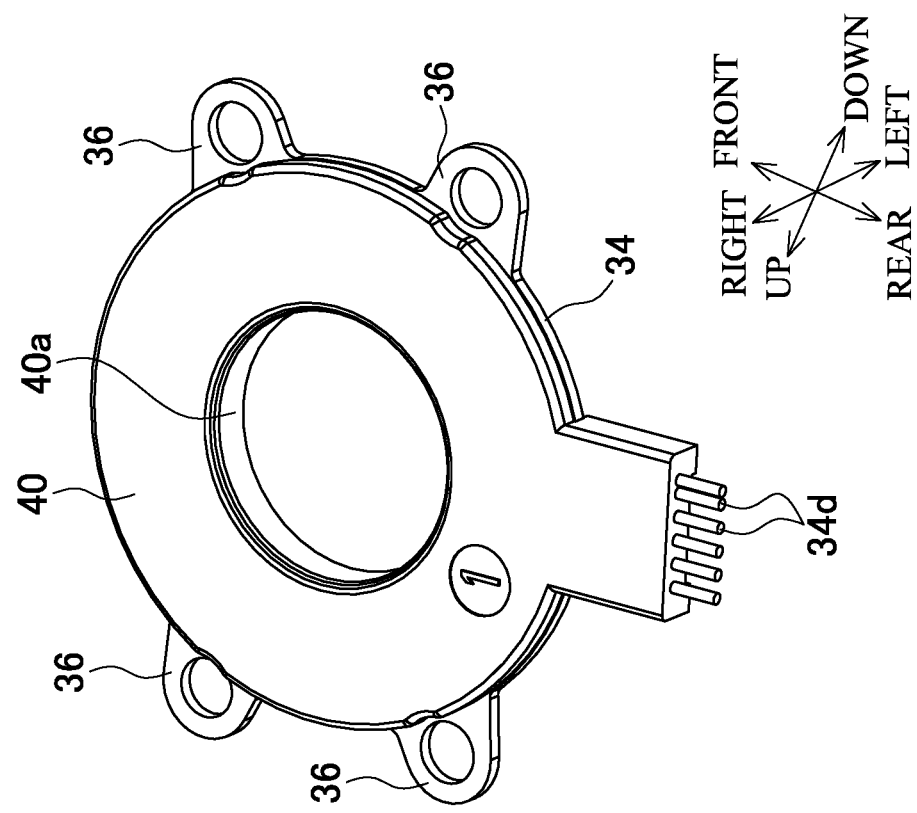
FIGS. 10A and 10B are an obverse side perspective view and a reverse side perspective view, respectively, of the sensor substrate with the covering member of FIGS. 8A and 8B.
Figure 10B:
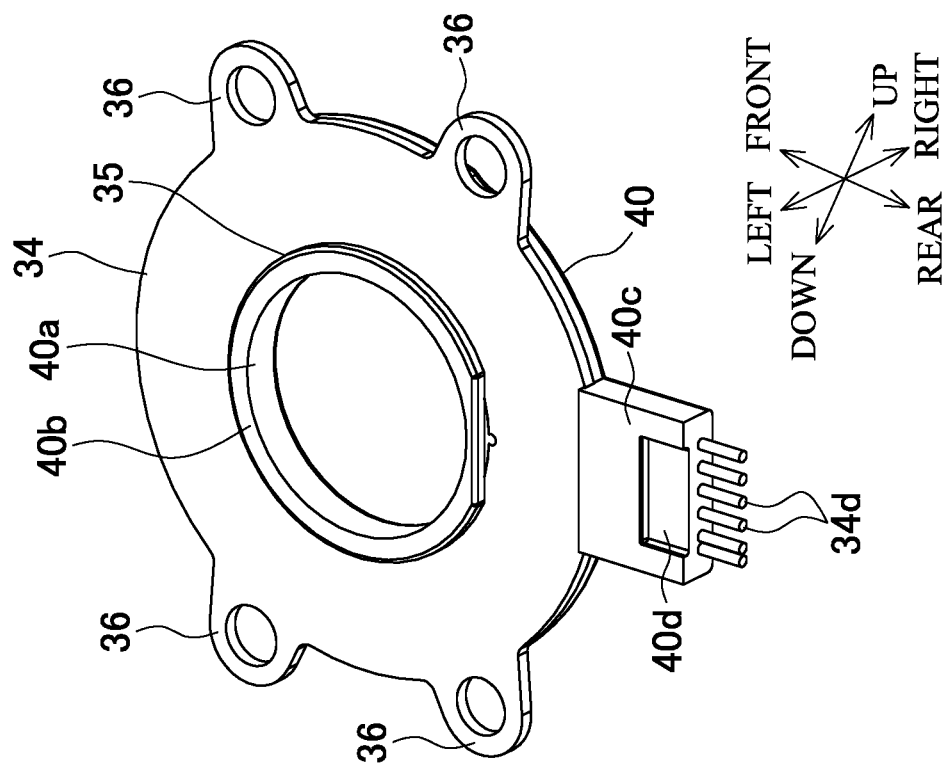
Figure 13B:
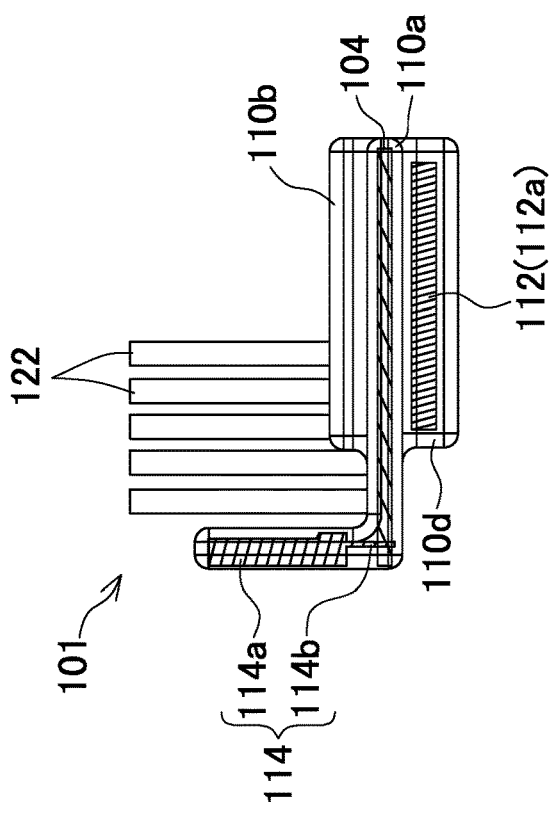
FIGS. 13A, 13B, 13C, and 13D are a top view, a D-D sectional view, a side view, and a view from the rear, respectively, of the controller substrate with the covering member in FIGS. 12A to 12C.
Figure 13D:
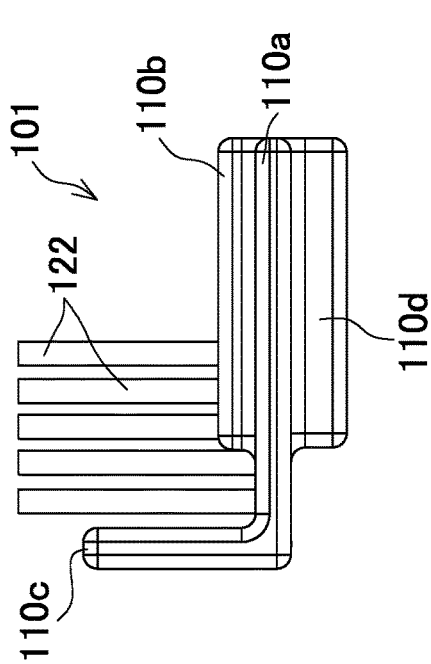
Figure 13A:
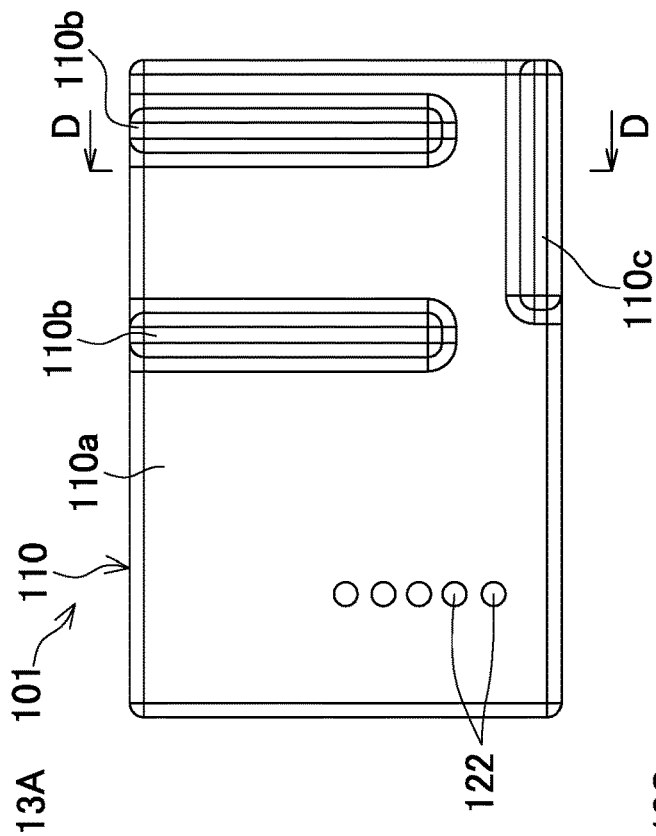
Figure 13C:
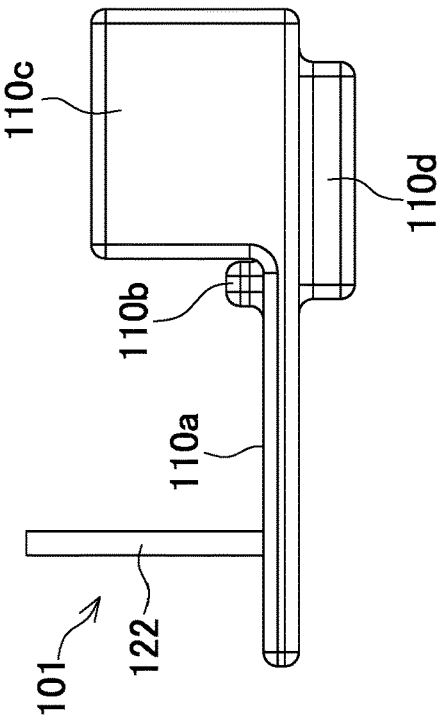

The stator 26 illustrated also in FIGS. 8A, 8B, and 9 includes a stator core 28, first and second insulating members 29a and 29b in contact with the stator core 28 (on the right and left sides thereof), and six coils 30 wound around the stator core 28 via the first and second insulating members 29a and 29b.

The rotor 27 includes a rotor shaft 31 extending in the right-left direction and disposed at the axial center, a tubular rotor core 32 disposed around the rotor shaft 31, and a plurality of (six) permanent magnets 33 and a plurality of (six) sensor permanent magnets (not illustrated) disposed on the outer surface of the rotor core 32. The rotor core 32 serves as the core of the rotor.

A sensor substrate 34 is fixed adjacent to the second insulating member 29b (on the left side) of the stator 26. The sensor substrate 34 is equipped, on the right surface thereof, with three rotation detecting elements 34a that detect positions of the above-mentioned sensor permanent magnets and output rotation detection signals.

The sensor substrate 34 illustrated also in FIGS. 10A, 10B, 11A, 11B, and 11C includes a ring-like portion 34R and a rectangular portion 34Q projecting rearward from a rear portion of the ring-like portion 34R, and has at the center a hole 35. The rotation detecting elements 34a are arranged around the hole 35 at predetermined intervals in the circumferential direction. The sensor substrate 34 is equipped, on the right surface (reverse face) thereof, with a thermistor 34b serving as a sensor for measuring a temperature and resistors (noise reducing elements) 34c, 34c that reduce noise in the sensor substrate 34. Moreover, the sensor substrate 34 is connected, at the rectangular portion 34Q, to a plurality of (six) lead wires 34d for transmitting the signals (rotation detection signals) of the rotation detecting elements 34a via terminals 34e. The terminals 34e serve as connecting portions of the respective lead wires 34d to the sensor substrate 34. Part of the terminals 34e is placed on the right surface of the rectangular portion 34Q of the sensor substrate 34.

The sensor substrate 34 has a two-layer structure including a right layer (reverse-side layer) and a left layer (obverse-side layer). The various elements described above and a circuit pattern, that is, an electrically conductive portion that conducts electricity are exposed on the reverse face and between the layers (on the reverse face of the left layer). The rotation detecting elements 34a, the thermistor 34b, and the resistors 34c are disposed so as to project from the reverse face of the sensor substrate 34, and these elements serve as conductive projecting portions that project relative to the peripheral portions thereof on the sensor substrate 34. These elements are not exposed on the obverse face, and thus, the left layer serves as an insulating layer formed of an insulating material.

The sensor substrate 34 is provided, at the right and left of the upper rim and at the right and left of the lower rim, with mounting hole portions 36 that project outward with respect to portions adjacent thereto.

The right surface of the sensor substrate 34 is covered with a covering member 40 formed by low-temperature, low-pressure injection molding. The covering member 40 made of a resin insulates electricity and does not block a magnetic field (transmits a magnetic field), and covers the rotation detecting elements 34a, the thermistor 34b, the resistors 34c, 34c, and the terminals 34e of the lead wires 34d (or ends on the terminal 35a side of the lead wires 34d) serving as the connecting portions. The lead wires 34d include conductive wires and tubular insulating coats covering the conductive wires. The insulating coats are disposed at portions other than the ends on the terminal 35a side, and the above-mentioned conductive wires are exposed at the ends on the terminal 35a side.

The covering member 40 integrally includes also an inner surface adjacent portion 40a (thick-walled portion) adjacent to the inner surface of the hole 35 of the ring-like portion 34R of the sensor substrate 34 and a rim adjacent portion 40b adjacent to a rim portion of the hole 35 on the left surface (obverse face) of the sensor substrate 34, and wraps around from the reverse face of the sensor substrate 34 equipped with the various elements to the inner surface of the thick-walled portion that is a surface different from the reverse face, or to a part of the obverse face on the opposite side of the reverse face. The covering member 40 wraps around to the obverse side of the rectangular portion 34Q (terminal obverse-side portion 40c) of the sensor substrate 34 through the periphery of the terminals 34e or the ends of the lead wires 34d. A recess 40d recessed rightward relative to the periphery thereof is provided on an outer side of the terminal obverse-side portion 40c on the covering member 40. The recess 40d is provided at a portion that does not overlap sensor substrate 34 (rectangular portion 34Q) inside, and the thickness of the portion is made closer to the thickness of the covering member 40 at a portion provided with the sensor substrate 34. By making the thickness closer to a uniform thickness in this manner, the speed of a molten resin is made more uniform and the molten resin can easily wrap around more uniformly while being injected. Thus, bubbles in the resin and undulations of the surface thereof are prevented, and thicknesses as designed are ensured.

The obverse and reverse faces of the mounting hole portions 36 are both not covered with the covering member 40.

The covering member 40 is attached to the sensor substrate 34, for example, in the following manner.

A mold for low-pressure insert molding is prepared, in which the sensor substrate 34 can be arranged and which has the shape corresponding to the covering member 40. For example, the mold includes a mold projecting portion corresponding to the recess 40d. One mold may be provided with one charging portion (resin injection portion) of the sensor substrate 34, or may be provided with a plurality of (such as four) resin injection portions.

A resin heated to be molten to have fluidity is extruded at a low pressure of substantially 0.1 megapascal (MPa) to 10 MPa into the mold in which the sensor substrate 34 is arranged (substrate arrangement step), and the covering member 40 is integrally molded on the reverse face side of the sensor substrate 34 (low-pressure injection molding, low-pressure resin extrusion step). In a general conventional resin molding process, the injection molding is performed at a high pressure of 40 MPa or higher. However, the low-pressure resin molding described above is performed at a pressure lower than that of the conventional resin molding, and the covering member 40 is integrally molded with the sensor substrate 34 (electric/electronic component) equipped with the elements, such as the rotation detecting elements 34a, and the circuit pattern (electrically conductive portion) without damaging, for example, elements having a limited resistance to pressure.

The injection molding is performed at a lower pressure, so that the molding is performed at a lower temperature, such as at 200° C. or lower. As a result, the covering member 40 is integrally molded with the sensor substrate 34 (electric/electronic component) equipped with the elements, such as the rotation detecting elements 34a, and the circuit pattern (electrically conductive portion) without damaging, for example, elements having a limited heat resistance.

The resin selected for use in the low-temperature, low-pressure injection molding is a resin suitable for the temperature and pressure of the injection molding (that melts to be injectable at the temperature and pressure), preferably a thermoplastic resin having a softening point below 200° C., more preferably a thermoplastic resin having a melting point below 200° C., and still more preferably a resin that has a softening point below 200° C. or a melting point below 200° C., and that contains, as a main component (at a percentage by weight of 50% or more), a polyamide containing an aliphatic skeleton (nylon).

The sensor substrate 34 with which the covering member 40 is integrally molded is taken out of the mold after a predetermined cooling time (such as two minutes) has elapsed (takeout step).

The sensor substrate 34 with the covering member 40 described above is fixed to the second insulating member 29b with screws 43 passing through the mounting hole portions 36 (refer to FIG. 4) (substrate installation step).

The stator core 28 has a total of six teeth 44 provided at even intervals in the circumferential direction and the coils 30 wound therearound (refer to FIGS. 8A and 8B). The teeth 44 project inward from the inner surface of the stator core 28. The second insulating member 29b includes a plurality of (six) holding portions 45 that are formed so as to project leftward from a ring-like left surface of the second insulating member 29b and are arranged at even intervals in the circumferential direction. The holding portions 45 are arranged between the teeth 44 in the circumferential direction. Cylindrical bosses 46 for the screws 43 are provided on both sides of each of the upper teeth 44 so as to project leftward, and cylindrical bosses 46 are also provided in the same manner on both sides of each of the lower teeth 44.

Each of the holding portions 45 has projections 48, 48 each having a U-shaped section. The projections 48, 48 are arranged in the circumferential direction of the second insulating member 29b so as to face each other, and project leftward to be higher than the left surface of the screwed sensor substrate 34 with the covering member 40. A coil terminal 49 for connecting each of the coils 30 is held between the pair of projections 48, 48 at corresponding one of the holding portions 45. Conductive wires 30a, which are connected to predetermined winding ends of the coils 30 or are independent, are connected in a predetermined order to the coil terminals 49.

A pair of receiving portions 50, 50 are provided between the rear holding portions 45, 45. The receiving portions 50, 50 project outward (rearward) from a rear portion of a cylindrical surface-like curved surface of the second insulating member 29b. The rectangular portion 34Q and the terminals 34e of the sensor substrate 34 and the covering member 40 therearound are disposed above the receiving portions 50, 50. The receiving portions 50, 50 are in contact with the reverse face of a rearward projecting portion of the covering member 40, and support the sensor substrate 34 and the rearward projecting portion of the covering member 40. The second insulating member 29b having the receiving portions 50, 50 plays a role as a support member supporting the covering member 40.

The rotor shaft 31 is rotatably supported by a bearing 55 held at a left portion of the motor housing 6 and a bearing 56 held at the motor housing 6. A first gear 57 is formed at a distal end portion (right portion) of the rotor shaft 31, and the right portion of the rotor shaft 31 is disposed in the motor housing 6. A base portion (left portion) of the rotor shaft 31 passes through a center hole of the second insulating member 29b and the hole 35 of the sensor substrate 34.

A centrifugal fan 58 for cooling the brushless motor 5 is disposed to the left of the bearing 56. The centrifugal fan 58 is fixed to the rotor shaft 31. A plurality of air intake ports (not illustrated) are formed in the left surface of the motor housing 6. A dished baffle plate 60 surrounding the centrifugal fan 58 is provided to the right of the stator 26. A hole for passing the rotor shaft 31 is formed in the baffle plate 60.

An output shaft 68 parallel to the rotor shaft 31 is provided to the right of the rotor shaft 31. A right end portion of the output shaft 68 is supported by a bearing 69a held by a bearing retainer 69. A central portion of the output shaft 68 is supported by a cylindrical guide 70. The bearing retainer 69 is mounted at a right portion of the motor housing 6.

A left portion of the output shaft 68 is provided with a second gear 72 that meshes with the first gear 57 of the rotor shaft 31 via an intermediate gear 71.

A right portion of the output shaft 68 reaches inside the blade case 8. The saw blade 4 is fixed to the right end portion of the output shaft 68 by screwing of a bolt 75 to the shaft center of the output shaft 68 from the right side in the state where the saw blade 4 is interposed between an outer flange 73 and an inner flange 74. The output shaft 68, the outer flange 73, the inner flange 74, and the bolt 75 constitute a tip tool holding portion.

A safety cover 76 covering a lower part of the saw blade 4 in the normal state is disposed in the blade case 8. The safety cover 76 is rotatably mounted on the bearing retainer 69. The safety cover 76 is rotatably urged toward the normal position.

An protruding housing 80 is provided behind the motor housing 6 so as to be connected thereto.

A controller 82 is accommodated in the protruding housing 80. The controller 82 includes a control circuit board (not illustrated). The control circuit board includes a rectifier circuit and an inverter circuit by mounting thereon, for example, a microcomputer, diodes, smoothing capacitors (electrolytic capacitors), and switching elements.

The lead wires 34d of the sensor substrate 34 are electrically connected to the controller 82.

The inside of the protruding housing 80 communicates with the motor housing 6, and an air intake port (not illustrated) is formed in the left side surface of the protruding housing 80.

The following describes an operation example of the circular saw 1 described above.

After the safety cover 76 is rotated from the normal position to such a position as to be accommodated in the blade case 8 and the switch 23 is turned on with the power cord 25 connected to the power supply, the brushless motor 5 is driven by a DC power source rectified by the controller 82. That is, the microcomputer of the controller 82 receives, through the lead wires 34d the rotation detection signals indicating the positions of the sensor permanent magnets of the rotor 27 output from the rotation detecting elements 34a of the sensor substrate 34 so as to acquire a rotating state of the rotor 27, and controls on/off of the switching elements according to the acquired rotating state to sequentially apply a current to each of the coils 30 of the stator 26, whereby the rotor 27 is rotated.

The rotation of the rotor 27 rotates the rotor shaft 31, which, in turn, rotates the intermediate gear 71 meshing with the first gear 57, and in turn, rotates the output shaft 68 via the second gear 72 meshing with the intermediate gear 71 to rotate the saw blade 4. As a result, an operator can cut a workpiece.

The centrifugal fan 58 rotates along with the rotation of the rotor shaft 31, whereby cooling air is suctioned into the motor housing 6 from the above-mentioned air intake ports, passes through the brushless motor 5 to cool the brushless motor 5, and then is sent toward the output shaft 68 by the baffle plate 60.

Cooling air suctioned from the air intake port of the protruding housing 80 passes through the controller 82 to cool the controller 82, and then moves into the motor housing 6 to be sent toward the output shaft 68 by the baffle plate 60 in the same manner.

Most of the cooling air sent toward the output shaft 68 blows out into the blade case 8, joins with air flow generated by the rotation of the saw blade 4, and is discharged from an exhaust port formed in the right side surface of the blade case 8. A part of the remaining cooling air is sent to the front end of the blade case 8, and is blown to the front end of the base 2. As a result, the marking line is prevented from being hidden by chips.

The covering member 40 made of a resin (dielectric material) is integrally molded with the sensor substrate 34 by the low-temperature, low-pressure injection molding, the covering member 40 covering the rotation detecting elements 34*a* the thermistor 34*b*, the resistors 34*c*, 34*c*, and the connecting portions (terminals 34*e*) of the lead wires 34*d* that serve as electrically conductive portions conducting electric currents.

In the circular saw 1 provided with the sensor substrate 34 including the electrically conductive portion conducting electricity, the electrically conductive portion is covered by the covering member 40 made of the thermoplastic resin having a softening point below 200° C.

Moreover, from the viewpoints of ease of the low-temperature, low-pressure injection molding operation and good molding quality, the resin of the covering member 40 preferably contains, as a main component, a polyamide having a softening point below 200° C. and containing an aliphatic skeleton.

Thus, the electrically conductive portion is covered by the covering member 40 through the low-temperature, low-pressure injection molding process, and the covering member 40 is attached to the sensor substrate 34 without causing a malfunction of the electrically conductive portion. In addition, the low-pressure resin extrusion step is completed in several hours, and after this process, only several minutes are required for the cooling period and the takeout step. Thus, the forming time of the covering member 40 is significantly shorter than that of the conventional adhesive bonding processes. Moreover, if other members of the circular saw 1 are disposed in an insulated state in positions adjacent to the sensor substrate 34, the other members can be disposed sufficiently close to the sensor substrate 34 while being kept in the insulated state by disposing the covering member 40 at a portion adjacent to the other members. Thus, the degree of freedom of layout of members in the circular saw 1 is ensured, and the close arrangement of the other members reduces the size of the periphery of the sensor substrate 34, and consequently, the sizes of the brushless motor 5 and the circular saw 1 can be reduced.

The covering member 40 can be deemed to be specified by a manufacturing method called the low-temperature, low-pressure injection molding. Even so, since what are called impossible or impractical circumstances are included, such a specification is considered to be allowed.

That is, a variety of resins are present that can be molded by the low-temperature, low-pressure injection molding, and it is not practical to directly specify the covering member 40 based on the structure or characteristics thereof by listing specific examples in order to distinguish the resins that can be molded by the low-temperature, low-pressure injection molding from resins that cannot be molded by the low-temperature, low-pressure injection molding. The thermoplastic resin having a softening point or a melting point below 200° C. and the resin containing a polyamide having an aliphatic structure as a main component and having a softening point or a melting point below 200° C. are typical examples of the resins that can be molded by the low-temperature, low-pressure injection molding. However, it is considered that all possibilities are not covered, and it is not clear whether the resins that can be molded by the low-temperature, low-pressure injection molding is completely distinguished from the resins that cannot be molded by the low-temperature, low-pressure injection molding.

The structures and characteristics specific to the resins molded by the low-temperature, low-pressure injection molding are not currently known, and even if such structures and characteristics exist, searching for the structures and characteristics is considered to require a large amount of equipment and time, and thus to be impossible or impractical.

Therefore, even if the covering member 40 is deemed to be specified by the manufacturing method called the low-temperature, low-pressure injection molding, such a specification should be allowed.

In addition, the covering member 40 has the recess 40*d* for making the thickness of the covering member 40 more uniform, and the mold for the covering member 40 has the mold projecting portion corresponding to the recess 40*d* so that the covering member 40 has the recess 40*d* for making the thickness of the covering member 40 more uniform. As a result, the quality of the covering member 40 is improved.

The sensor substrate 34 includes, as a part of the electrically conductive portion mounted on the sensor substrate 34, the conductive projecting portions (the rotation detecting elements 34*a*, the thermistor 34*b*, the resistors 34*c*, and the terminals 34*e*) that project relative to the peripheral portions thereof on the sensor substrate 34, and the covering member 40 covers the conductive projecting portions and the peripheral portions thereof. Thus, the covering member 40 for protection can be easily provided also over the three-dimensional electrically conductive portion in a short time.

Moreover, the covering member 40 is in contact with the reverse face of the sensor substrate 34, and also with the inner surface of the thick-walled portion of the sensor substrate 34 at the inner surface adjacent portion 40*a*, and is further in contact with the obverse face of the sensor substrate 34 at the rim adjacent portion 40*b*. As a result, the covering member 40 not only spreads over the reverse face of the sensor substrate 34, but also wraps around at the inner surface adjacent portion 40*a* and the rim adjacent portion 40*b*. Thus, a situation where the covering member 40 comes off the sensor substrate 34 is less likely than in a case where the covering member 40 spreads only over the reverse face of the sensor substrate 34.

Furthermore, the lead wires 34*d* are connected to the sensor substrate 34, and the covering member 40 covers the connecting portions (terminals 34*e*) between the lead wires 34*d* and the sensor substrate 34. As a result, the lead wires 34*d* are prevented from coming off. The lead wires 34*d* are bundled by the covering member 40 without separately using, for example, a heat-shrinkable tube, and are arranged in a natural manner in positions suitable for wiring. Moreover, since the connecting portions (terminals 34*e*) are covered together with the other part of the electrically conductive portion, the lead wires 34*d* can also be processed at a time in conjunction with insulation processing.

The circular saw 1 includes the second insulating member 29*b* having the receiving portions 50, 50 in contact with the covering member 40. Thus, the covering member 40 comes in contact with the receiving portions 50, 50, and elasticity of the covering member 40 prevents the receiving portions 50, 50 from vibrating. In particular, since the receiving portions 50, 50 are in contact with the covering member 40 outside the terminals 34*e* (connecting portions to the lead wires 34*d*), effective protection can be given to the connecting portions (terminals 34*e*) that are relatively likely to have failures, such as disconnection and electric leakage.

Moreover, the method for manufacturing the circular saw 1 includes the substrate arrangement step of arranging, in the mold, the sensor substrate 34 for the circular saw 1 including the electrically conductive portion conducting electricity, the low-pressure resin extrusion step of heating at 200° C. or lower to melt the thermoplastic resin having a softening point below 200° C., and then extruding the melted thermoplastic resin into the mold at a low pressure of 0.1 MPa to 10 MPa, both inclusive, the takeout step of taking, out of the mold, the sensor substrate 34 that has been attached to the covering member 40 integrally molded with the thermoplastic resin, and the substrate installation step of installing the sensor substrate 34 integrally molded with the covering member 40 into the brushless motor 5 of the circular saw 1. Thus, the covering member 40 for protecting the electrically conductive portion can be easily attached in a short time without damaging the electrically conductive portion, and the circular saw 1 is manufactured in the state where the sensor substrate 34 and members adjacent thereto are ensured to be insulated with a high degree of freedom of layout, and the size of the circular saw 1 can be reduced.

Second Embodiment

A circular saw according to a second embodiment of the present invention is the same as that of the first embodiment except in the controller.

The portions and members similar to those of the first embodiment are assigned with the same reference numerals as those of the first embodiment where appropriate, and description thereof will be omitted.

A controller 101 of the second embodiment illustrated in FIGS. 12A to 13D includes a control circuit board 104 having a one-layer structure and a covering member 110.

The control circuit board 104 is equipped with an intelligent power module (IPM) 112.

The IPM 112 includes a plurality of (six) switching elements (not illustrated). The switching elements are insulated-gate bipolar transistors (IGBTs).

The IPM 112 includes a flat plate-like IPM body 112*a* and a plurality of terminals 112*b* led out sideward and upward from both sides of the IPM body 112*a*. The IPM body 112*a* is disposed below the lower surface of the control circuit board 104 so as to extend along the lower surface. The terminals 112*b* passes through small holes provided in the control circuit board 104 so as to correspond to two-row arrangement of the terminals 112*b*, and project through the upper surface of the control circuit board 104.

The control circuit board 104 is equipped with a diode bridge 114. The diode bridge 114 applies full-wave rectification to an alternating-current voltage supplied from the alternating-current power supply via the power cord 25 and a fuse (not illustrated), and outputs the voltage between a power supply line and a ground line on the control circuit board 104. The output voltage of the diode bridge 114 appears as a voltage of the power supply line with respect to the ground line.

The diode bridge 114 includes an upright plate-like diode bridge body 114*a* and a plurality of terminals 114*b* lead out downward from lower portions of the diode bridge body 114*a*. The diode bridge body 114*a* is disposed in an upright state above the upper surface of the control circuit board 104. The terminals 114*b* pass through small holes of the control circuit board 104, and slightly project through the lower surface of the control circuit board 104.

Moreover, the control circuit board 104 is equipped with a microcomputer 116, a capacitor 118 and a resistor 120.

The microcomputer 116 transmits control signals to the switching elements of the IPM 112.

The switching elements of the IPM 112 include three switching elements serving as high-side switches and three switching elements serving as low-side switches. The IPM 112 outputs drive signals to gates of the respective switching elements according to the control signals from the microcomputer 116 so as to turn on/off the switching elements in a predetermined sequence. Turning on of any of the switching elements establishes a current-conducting path to the brushless motor 5.

The capacitor 118 is an electric component that serves as a snubber circuit.

The resistor 120 is used for current detection.

In addition, the control circuit board 104 is electrically connected to a plurality of lead wires 122. The lead wires 122 are electrically connected to the IPM 112 and the microcomputer 116, and also electrically connected to the brushless motor 5 (coils 30).

A circuit pattern is arranged on the upper surface and the lower surface of the control circuit board 104. This circuit pattern, the IPM 112, the diode bridge 114, the microcomputer 116, the capacitor 118, the resistor 120, and the lead wires 122 (connecting portions 122*a* thereof to the control circuit board 104) serve as electrically conductive portions on the control circuit board 104.

The covering member 110 covers the whole control circuit board 104, and thus seals the control circuit board 104. The covering member 110 does not cover portions of the lead wires 122 other than the connecting portions 122*a*. The lead wires 122 include conductive wires and tubular insulating coats covering the conductive wires. The insulating coats are disposed at portions other than connecting portions 122*a*.

The covering member 110 is formed by the low-temperature, low-pressure injection molding in the same manner as the covering member 40 of the first embodiment.

The covering member 110 includes a flat plate-like base portion 110*a* extending along the control circuit board 104, linear raised portions 110*b*, 110*b* raised upward of the base portion 110*a* to cover the rows of the terminals 112*b* of the IPM 112, a projecting portion 110*c* greatly projecting upward of the base portion 110*a* to cover the upright diode bridge body 114*a*, and a lower surface raised portion 110*d* raised downward of the base portion 110*a* to cover the IPM body 112*a*.

The covering member 110 has a substantially constant thickness so as not to have a complicated shape as much as possible while protecting the electrically conductive portion. That is, since the terminals 112*b* of the IPM 112 extend so as to protrude through the base portion 110*a*, the linear raised portions 110*b* covering the respective rows of the terminals 112*b* are raised higher than the base portion 110*a* by an amount of the protrusion. Since the terminals 114*b* of the diode bridge 114 extend so as not to protrude through the base portion 110*a*, no raised portions are provided corresponding to the terminals 114*b*, and a flat state (with a constant thickness) is maintained. Moreover, the thickness of the projecting portion 110*c* around the diode bridge body 114*a* is substantially equal to the thickness of the lower surface raised portion 110*d* around the IPM body 112*a*. It should be noted that the covering member 110 has at least one flat surface.

A mold for the covering member 110 has a shape corresponding to the shape of the covering member 110, and in particular, has mold recessed portions corresponding to the raised portions so as to cause the covering member 110 to have the raised portions (the linear raised portions 110*b*, the projecting portion 110c, and the lower surface raised portion 110d) for making the thickness thereof more uniform.

In the circular saw according to the second embodiment, since the control circuit board 104 of the controller 101 is sealed with the covering member 110 formed by the low-temperature, low-pressure injection molding, the control circuit board 104 having the electrically conductive portion on both surfaces thereof is sufficiently protected as a whole, and the structure for the protection is easily formed in a short time. The insulation of the control circuit board 104 is ensured, the degree of freedom of layout of the control circuit board 104 and members adjacent thereto is increased, and the size of the circular saw can be reduced.

The covering member 110 is provided with the raised portions (the linear raised portions 110b, the projecting portion 110c, and the lower surface raised portion 110d) for making the thickness thereof more uniform, and the mold for the covering member 110 has the mold recessed portions corresponding to the raised portions so as to cause the covering member 110 to have the raised portions for making the thickness thereof more uniform. As a result, the generation of, for example, bubbles and undulations is prevented during the formation of the covering member 110, and the high-quality covering member 110 can be provided.

Moreover, the IPM body 112a, the terminals 112b, the diode bridge body 114a, the terminals 114b, the microcomputer 116, the capacitor 118, and the resistor 120 serve as the conductive projecting portions projecting relative to the peripheral portions thereof on the control circuit board 104, and the covering member 110 covers the conductive projecting portions and the peripheral portions thereof. The covering can be applied in a short time and with high quality to the projecting structure (three-dimensional structure) that is difficult to be covered by conventional adhesive. In particular, although the diode bridge body 114a has the upright plate-like shape and projects higher than the control circuit board 104 (for example, to a projection height of three times or more the thickness of the board), the covering member 110 can cover the diode bridge body 114a.

In addition, the lead wires 122 are connected to the control circuit board 104, and the covering member 110 covers the connecting portions 122a of the control circuit board 104. As a result, the lead wires 122 are prevented from coming off. The lead wires 122 are bundled by the covering member 110 without separately using, for example, a heat-shrinkable tube, and are arranged in a natural manner in positions suitable for wiring. Moreover, since the connecting portions 122a are covered together with the other part of the electrically conductive portion, the lead wires 122 can also be processed at a time in conjunction with protection processing.

Third Embodiment

A circular saw according to a third embodiment of the present invention is the same as that of the second embodiment except in the sensor substrate and the controller (control circuit board).

The portions and members similar to those of the second embodiment are assigned with the same reference numerals as those of the second embodiment where appropriate, and description thereof will be omitted.

Figure 14:
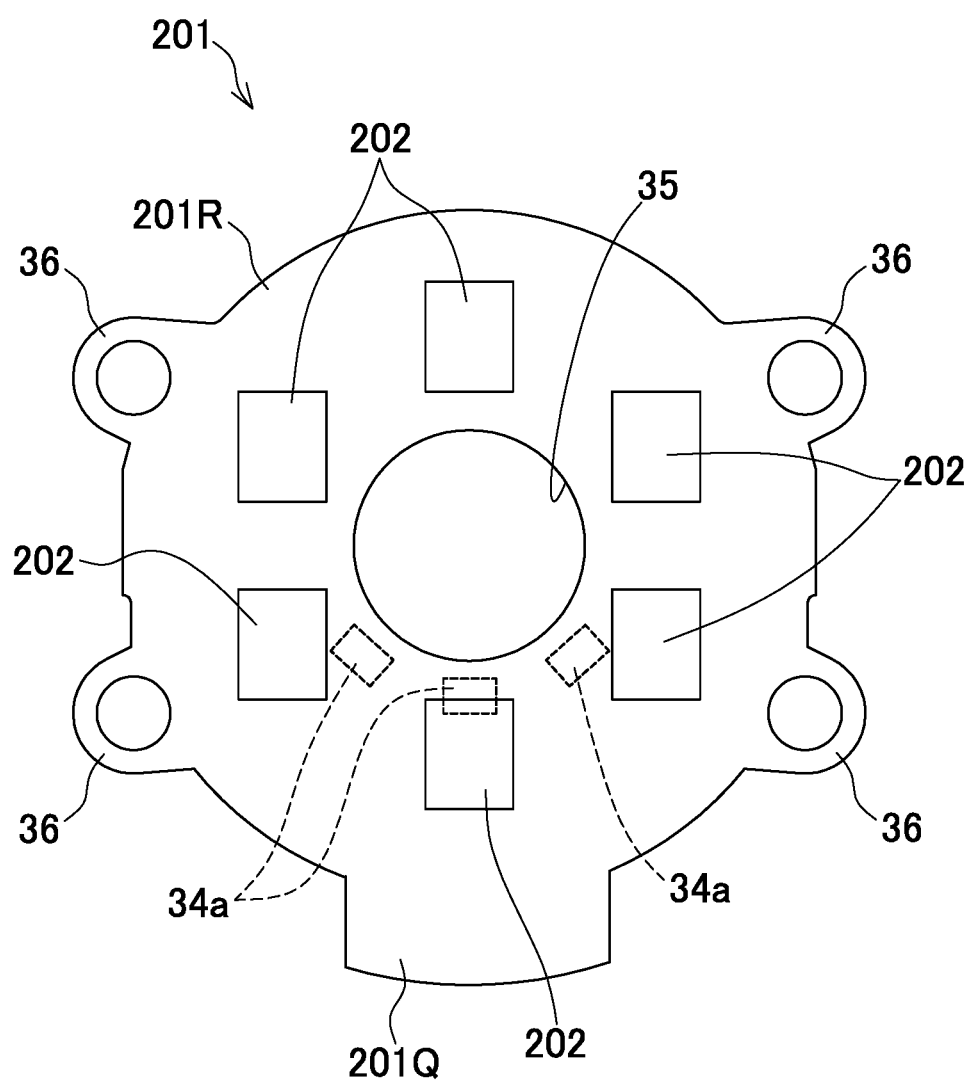
FIG. 14 is an obverse side view of a sensor substrate of a circular saw according to a third embodiment of the present invention.

A sensor substrate 201 of the third embodiment illustrated in FIG. 14 has a shape in which a tongue-like extending portion 201Q extends outward from a part of a ring-like portion 201R.

The sensor substrate 201 is equipped, on the reverse face thereof, with the three rotation detecting elements 34a and on the obverse face thereof, with a plurality of (six) field-effect transistors (FETs) 202 serving as switching elements. Although not illustrated, the sensor substrate 201 is equipped with a thermistor and a resistor, to each of which one of the lead wires 34d is connected at the extending portion 201Q.

The three rotation detecting elements 34a are disposed on the extending portion 201Q side of a peripheral portion of the hole 35 at the center of the ring-like portion 201R.

The FETs 202 are turned on/off according to control signals from a microcomputer (not illustrated) on the control circuit board to switch between conducting and nonconducting states of currents to the brushless motor 5.

The same type of covering member (not illustrated) as that of the second embodiment covers the whole sensor substrate 201 except the mounting hole portions 36.

The control circuit board according to the third embodiment is not equipped with the IPM 112.

In the circular saw according to the third embodiment, since the sensor substrate 201 is sealed with the covering member formed by the low-temperature, low-pressure injection molding, the sensor substrate 201 having the electrically conductive portion on both surfaces thereof is sufficiently protected as a whole, and the structure for the protection is easily formed in a short time. The insulation of the sensor substrate 201 equipped with the FETs 202 as the switching element and the rotation detecting elements 34a is ensured, the degree of freedom of layout of the sensor substrate 201 and members adjacent thereto is increased, and the size of the circular saw can be reduced.

Modifications and so Forth

The present invention is not limited to the embodiments described above. For example, the following modifications can be made to, for example, the embodiments described above.

The covering member may cover a part, instead of the whole, of the electrically conductive portion. A plurality of covering members may be provided on one substrate. The covering member may cover the mounting hole portions of the sensor substrate. The number of the mounting hole portions may be three or smaller, or five or larger. The mounting hole portions need not project relative to the other portions of substrate.

In the covering member, the recess and the portion supported by the receiving portions may be provided at other portions of the covering member, instead of, or in addition to, at the outer side of the lead wire connection terminals. In the covering member, the raised portions for making the thickness thereof more uniform may be provided at other portions, or both recessed portions and the raised portions may be provided on the same substrate. These modifications apply to mold raised portions and the mold recessed portions in the same manner where appropriate.

The covering member may be provided on at least one of the sensor substrate and the control circuit board, and may be provided on other substrates, such as a substrate for a switch and a substrate for a display unit, instead of, or in addition to, on at least one of the sensor substrate and the control circuit board.

The lead wires need not be connected to the substrate. The lead wires connected to the substrate may be various signal wires, power wires, or a combination of such wires. The number of the lead wires may be one, or two or more. Instead of extending in the direction along the sensor substrate, the lead wires may extend in a direction intersecting at least one of the obverse and reverse faces of the rectangular portion or the extending portion of the sensor substrate, or may extend in a direction along the control circuit board, or some lead wires of each of the substrates may extend in a direction intersecting the substrate whereas other lead wires thereof may extend in a direction along the substrate. The lead wires of the sensor substrate may be connected to a portion other than the rectangular portion and the extending portion.

Any types, numbers, and shapes of the elements and the circuit pattern may be mounted on the substrate. For example, the number of the rotation detecting elements may be two or smaller, or four or larger, no thermistor or two or more thermistors may be provided, no lead wire connection terminal or two or more lead wire connection terminals may be provided, the diode bridge may have a cylindrical shape or a flat plate shape along the substrate, and coils or light-emitting diodes (LEDs) may be mounted. Instead of being provided in an exposed state on the surface of the substrate, the circuit pattern may be provided inside the substrate, or may be omitted. Instead of providing the elements and the circuit pattern projecting from the substrate, only a circuit pattern not projecting from the substrate may be provided. The substrate may have a multilayer structure having three or more layers. The substrate may have a shape other than the ring shape or the rectangular shape.

The covering member may wrap around from an outer circumferential portion of the sensor substrate to be adjacent to a plurality of faces of the substrate.

The sensor substrate may be mounted at the first insulating member, or may be disposed at a place apart from the brushless motor. The control circuit board may be disposed outside the controller.

The support member for supporting the substrate may be another member, such as, typically, the housing.

The numbers of the permanent magnets and the coils (number of poles of the rotor) of the brushless motor can be increased or reduced as appropriate. The brushless motor may have four poles, for example. The predetermined electrical connection to the coils need not be made via the coil terminals held by the holding portions. The numbers and shapes of the holding portions and the coil terminals may be changed as appropriate. For example, four holding portions and four coil terminals may be provided for four coils, or three holding portions and three coil terminals may be provided for six coils.

The motor may be a brushed motor.

The switching elements may be elements of another type, such as bipolar transistors. The switching elements configured to drive the brushless motor may be other than those included in the IPM (second embodiment) or the six FETs (third embodiment).

The diode bridge according to the second embodiment may be mounted extending along the control circuit board, instead of extending upright.

The electronic components (elements) described above may be mounted on the various substrates for purposes other than the above-described purposes. Other types of electronic components may be mounted for the above-described purposes. Moreover, the arrangement of the electronic components (including the connecting portions of the lead wires) and the circuit pattern is not limited to that described above, that is, some of the electronic components may be omitted, other electronic components may be added, the IPM body and the microcomputer may be mounted on the same face of the substrate in the second embodiment, the FETs and the rotation detecting elements may be mounted on the same face (obverse or reverse face) in the third embodiment, or the FETs may be mounted on the reverse face with the rotation detecting elements mounted on the obverse face in the third embodiment. Furthermore, the microcomputer may be mounted on the sensor substrate in the second and third embodiments, or the FETs may be mounted on the control circuit board in the third embodiment. In addition, the types and combination of the mounted electronic components are not limited to those described above, but any configuration may be employed.

As a speed reduction mechanism from the motor output to the output shaft in the circular saw, a planetary gear reduction mechanism may be used, or an intermediate shaft and gears meshing therewith may be arranged between the rotor shaft and the output shaft.

The present invention can be applied to, for example, handheld cutting machines other than the circular saw, non-handheld cutting machines, electric power tools, such as rechargeable and non-rechargeable impact drivers and driver drills, cleaners, and gardening tools including, typically, trimmers for gardening.

Furthermore, the following method is also encompassed by the present disclosure.

A method for manufacturing an electric power tool includes arranging, in a mold, a substrate for an electric power tool including an electrically conductive portion configured to conduct electricity, heating at 200° C. or lower to melt a thermoplastic resin having a softening point below 200° C., and then extruding the melted thermoplastic resin into the mold at a low pressure of 0.1 megapascal to 10 megapascals, both inclusive, taking the substrate with which the thermoplastic resin has been integrally molded out of the mold, and installing the substrate with which the thermoplastic resin has been integrally molded into the electric power tool.

The mold may include a mold projecting portion or a mold recessed portion corresponding to a recessed portion or a raised portion so as to cause the thermoplastic resin to have the recessed portion or the raised portion that make a thickness of the thermoplastic resin more uniform.

The thermoplastic resin may contain, as a main component, a polyamide having a softening point below 200° C. and containing an aliphatic skeleton.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An electric power tool comprising:
a stator including a stator core, an insulating member held by the stator core, and a coil held by the insulating member,
a rotor including a rotor core located inside the stator and a permanent magnet fixed to the rotor core,
a rotor shaft fixed to the rotor,
a rotation detecting element that detects a position of the permanent magnet,
a sensor substrate equipping the rotation detecting element, and
a thermoplastic resin having a softening point below 200° C. that covers the rotation detecting element and at least a part of the sensor substrate.

2. The electric power tool according to claim 1, wherein the sensor substrate has a hole through which the rotor shaft passes, and
the thermoplastic resin has an inner surface adjacent portion adjacent to an inner surface of the hole.

3. The electric power tool according to claim 1, wherein
the sensor substrate has a mounting hole portion so that the sensor substrate is fixed to the insulating member, and
the mounting hole portions are not covered with the thermoplastic resin.

4. The electric power tool according to claim 1, wherein
the sensor substrate has a connecting portion,
a lead wire is connected to the connecting portion, and
the thermoplastic resin covers the connecting portion and a part of the lead wire.

5. The electric power tool according to claim 4, wherein
the sensor substrate has a first surface and a second surface, and
the rotation detecting element and the lead wire are connected to the first surface.

6. The electric power tool according to claim 5, wherein
at least a part of the sensor substrate is not covered with the thermoplastic resin.

7. The electric power tool according to claim 5, wherein
a plurality of transistors are connected to the second surface, and
the plurality of transistors is covered with thermoplastic resin.

8. The electric power tool according to claim 7, wherein
a resistor and a thermistor are connected to the first surface, and
the resistor and the thermistor are covered with thermoplastic resin.

* * * * *